Patented Dec. 27, 1932

1,892,229

UNITED STATES PATENT OFFICE

KARL ZAHN AND KURT SCHIMMELSCHMIDT, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

DYESTUFFS OF THE DIBENZANTHRONE SERIES

No Drawing.   Application filed October 20, 1930. Serial No. 490,091.

The present invention relates to new dyestuffs of the dibenzanthrone series.

We have found that compounds of the following general formula:

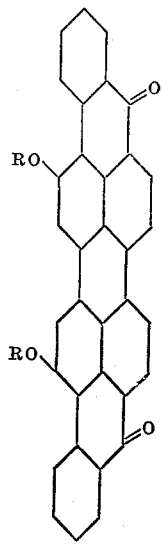

wherein R stands for alkyl are valuable vat dyestuffs which dye the fiber excellently clear navy blue tints of very good fastness to chlorine and to light. The new dyestuffs may be prepared, for instance, by causing an alkaline condensing agent to act upon an alkylether of Bz-3-hydroxybenzanthrone.

The following example serves to illustrate the invention, but it is not intended to limit it thereto, the parts being by weight:

1. 10 parts of Bz-3-ethoxy-benzanthrone, 125 parts of aniline and 20 parts of powdered caustic potash are heated under reflux on the oil bath to 200° C. while stirring. After about 3 hours the formation of the dyestuff is finished. The melt is poured into water and the aniline is distilled off by means of steam. The separation of the dyestuff is finished by blowing air through the remaining alkaline solution. The solution is filtered with suction, the solid matter is washed and dried and the new dyestuff is thus obtained as a reddish violet powder. It dissolves in concentrated sulfuric acid to an olive green solution and in organic solvents to a blue solution, yielding with alkaline hydrosulfite a blue vat from which the fiber is dyed excellently fast navy blue.

We claim:

1. As new products, compounds of the following formula:

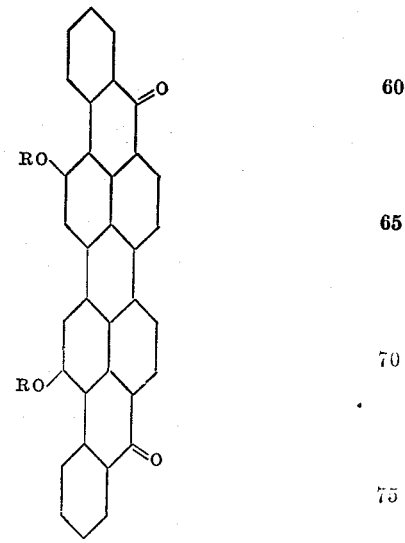

wherein R stands for alkyl being valuable dyestuffs which dissolve in concentrated sulfuric acid to an olive green solution and in organic solvents to a blue solution, yielding with alkaline hydrosulfite a blue vat from which the fiber is dyed excellently fast navy blue tints.

2. As a new product, the compound of the following formula:

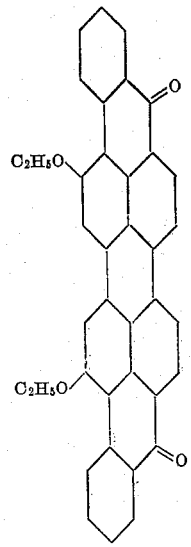

being a valuable dyestuff which dissolves in concentrated sulfuric acid to an olive green solution and in organic solvents to a blue solution, yielding with alkaline hydrosulfite a blue vat from which the fiber is dyed excellently fast navy blue tints.

In testimony whereof, we affix our signatures.

KARL ZAHN.
KURT SCHIMMELSCHMIDT.